US008630917B2

(12) United States Patent
Belanger et al.

(10) Patent No.: US 8,630,917 B2
(45) Date of Patent: *Jan. 14, 2014

(54) ARRANGEMENT FOR GUIDING USER DESIGN OF COMPREHENSIVE PRODUCT SOLUTION USING ON-THE-FLY DATA VALIDATION

(75) Inventors: David G. Belanger, Hillsborough, NJ (US); Adrian Kester, Basking Ridge, NJ (US); Sam Parker, Cranbury, NJ (US); Sarat Puthenpura, Berkeley Heights, NJ (US); Phyllis Weiss, Englewood, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/646,036

(22) Filed: Dec. 23, 2009

(65) Prior Publication Data

US 2010/0100220 A1    Apr. 22, 2010

Related U.S. Application Data

(63) Continuation of application No. 11/233,705, filed on Sep. 23, 2005, now Pat. No. 7,689,467.

(60) Provisional application No. 60/689,029, filed on Jun. 9, 2005.

(51) Int. Cl.
*G06Q 30/00*    (2012.01)

(52) U.S. Cl.
USPC ...... 705/26.5; 705/26.1; 705/26.63; 705/26.8

(58) Field of Classification Search
USPC .......................... 705/26.1, 26.5, 26.63, 26.8
See application file for complete search history.

(56) References Cited

U.S. PATENT DOCUMENTS

| 5,889,932 | A | 3/1999 | Adegeest et al. | |
|---|---|---|---|---|
| 5,999,908 | A | 12/1999 | Abelow | |
| 6,167,383 | A * | 12/2000 | Henson | 705/26.5 |
| 6,937,913 | B2 | 8/2005 | Nishikawa et al. | |
| 7,162,703 | B1 * | 1/2007 | Aik | 716/106 |
| 2004/0177002 | A1 | 9/2004 | Abelow | |
| 2005/0021599 | A1 | 1/2005 | Peters | |
| 2005/0131783 | A1 | 6/2005 | Jin | |
| 2006/0123364 | A1 * | 6/2006 | Cook et al. | 716/4 |
| 2008/0255926 | A1 | 10/2008 | Nakano et al. | |

* cited by examiner

*Primary Examiner* — Yogesh C Garg
(74) *Attorney, Agent, or Firm* — Hanley, Flight & Zimmerman, LLC

(57) ABSTRACT

A computer-implemented method guides a user in designing a product defined by data. The method involves examining (420) items of the data to detect whether each item conforms to rules (106) or violates the rules; performing (431 . . . ) at least one action in response to a detection of a rule violation; displaying (450) the data to the user in a manner emphasizing at least one particular data item that caused the rule violation; receiving (460) any new data input from the user; and repeating the examining, action performing, and displaying steps using the new data. The displaying step may involve displaying data defining a current state of the product in a tabular (spreadsheet) format, including displaying data detected to have caused the rule violation in a first manner that is visibly distinct from displaying other data that is not detected to have caused the rule violation.

18 Claims, 4 Drawing Sheets

ARRANGEMENT FOR GUIDING USER DESIGN OF COMPREHENSIVE PRODUCT SOLUTION USING ON-THE-FLY DATA VALIDATION

CROSS-REFERENCE TO RELATED APPLICATIONS

This patent arises from a continuation of and claims priority to U.S. application Ser. No. 11/233,705, filed Sep. 23, 2005, now U.S. Pat. No. 7,689,467; and further claims priority to U.S. provisional application 60/689,029, filed Jun. 9, 2005, both of which are incorporated herein by reference in their entirety.

BACKGROUND

1. Field of the Invention

This invention relates to arrangements for guiding users in designing complex products. More specifically, the invention relates to arrangements for guiding telecommunications service providers in designing telecommunications solutions for customers, and in pricing and costing those solutions.

2. Related Art

Service providers have a critical need to configure solutions for customers based on customer needs, and to price and cost them optimally. For example, a telecommunications service provider may desire to quickly and easily configure a telecommunications network service account with customer-selected capabilities and features. Each capability and feature has a cost to the service provider and a price to the customer. Telecommunications service providers often use sophisticated tools for this purpose. However, the use of these tools, and hence the efficiency of the sales process, depends on how quickly and accurately information can be entered, and on how easily data may edited after entry. In many instances, data input and editing capabilities can essentially determine the overall usefulness of solution configuration tools, pricing systems, and costing systems.

Conventionally, a general purpose computer program has been used to input data to these tools. For example, a general purpose spreadsheet program such as Microsoft Excel™ may be used to perform this function. This approach is based on the perception that a tabular (row and column) format is familiar to many workers and fits many input formats and requirements. It is also based on the observation that network connectivity and network service data may be entered for many sites, often hundred of sites.

However, such potentially complex and interrelated data requires extensive data validation. If the allowed data range or type of a given data item depend on the value of another data item, cumbersome navigation between data items is required. General purpose spreadsheet programs may be widely used for data entry and manipulation, but do not have convenient ways of data validation, especially if such data must satisfy complex validation rules. However, if data validation mechanisms are complex, users find them unwieldy to use.

Thus, there is a need in the art for inputting and editing data efficiently, while automatically scrutinizing data to assure its integrity.

SUMMARY

A computer-implemented method guides a user in designing a product defined by data. The method involves examining items of the data to detect whether each item conforms to rules or violates the rules; performing at least one action in response to a detection of a rule violation; displaying the data to the user in a manner emphasizing at least one particular data item that caused the rule violation; receiving any new data input from the user; and repeating the examining, action performing, and displaying steps using the new data.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
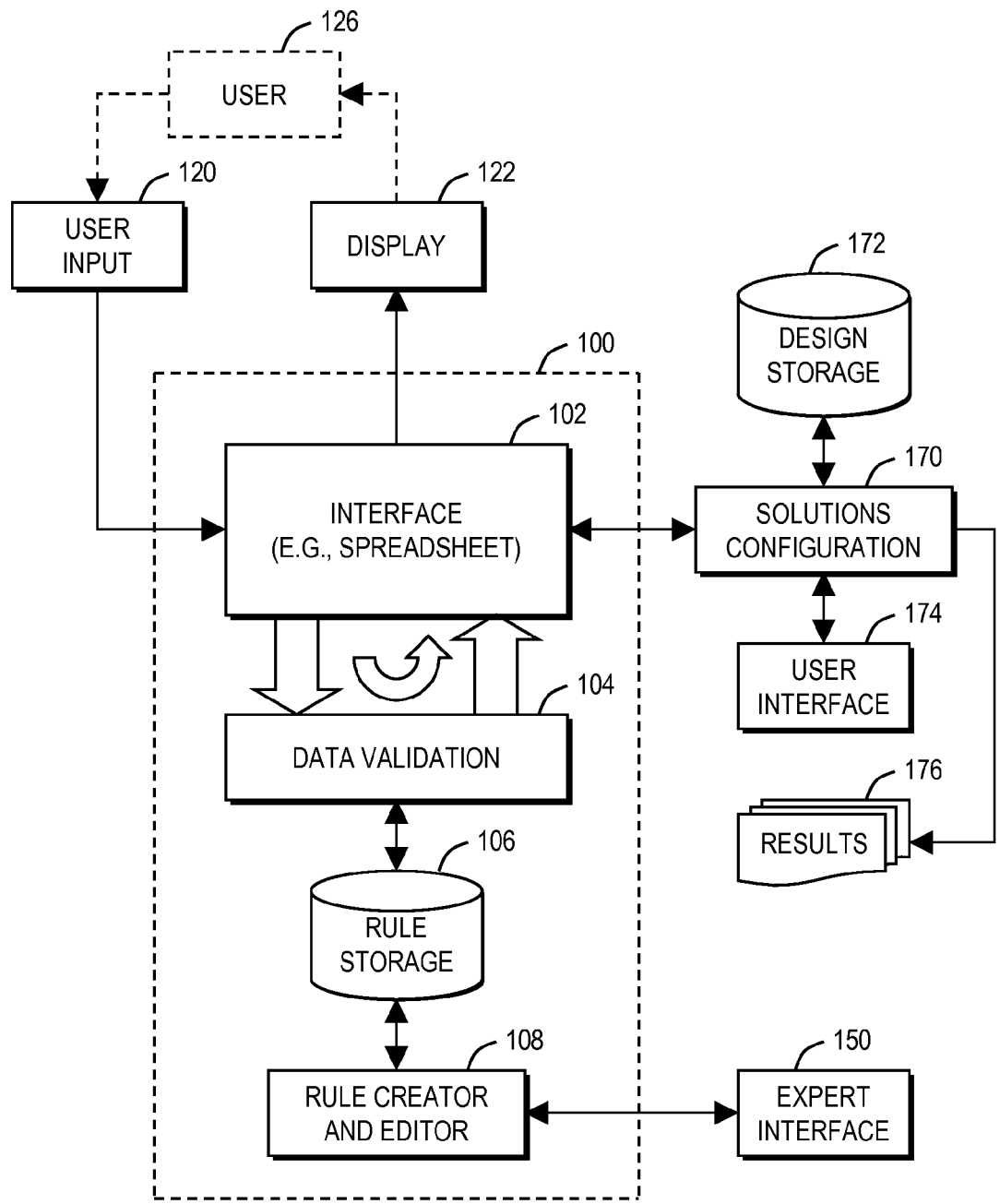
FIG. 1 shows an architecture of one embodiment of a system according to the present invention.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

FIG. 1 shows an embodiment that captures information defining a product design for a customer, and subsequently adds, modifies, and deletes design features and components. In one useful application, the customer's product is a service provided by a telecommunications network by a telecom operator. The entire product design activity is guided and validated by appropriate business rules created and modified by a domain expert or other administrator.

Advantageously, the described embodiment reduces cost and minimizes the time needed to create and/or modify complex custom telecom solutions, and to price and cost them. The embodiment provides both flexibility and speed in arriving at optimal solutions.

Referring to FIG. 1, an apparatus 100 has an interface 102 that presents the product design to a user 126. User 126 may be a customer, the end user of the product. However, in more complex domains such as telecommunications service, user 126 typically requires some degree of specialized expertise and may be a salesman for the telecommunications service provider.

In one embodiment, interface 102 is a tabular (table-based) interface. In that embodiment, interface 102 includes cells to represent data in tabular (row-and-column) format. The tabular format resembles that of a conventional "spreadsheet" application, well known among virtually all computer users. Interface 102 is used to load existing designs, manipulate them, and upload them to a central server for further processing. Tabular interface 102 is displayed to user 126 on a suitable display unit 122 that may be part of the same personal computer or device that includes a user input 120.

Data can be input in bulk or individually to tabular interface 102 through a suitable input such as user input 120. Bulk input may be implemented by uploading a pre-populated spreadsheet when, for example, user input 120 is a personal computer with a magnetic or optical disk drive. Also, the user may "cut and paste" information from commonly used PC spreadsheet applications such as Microsoft Excel™. Individual datum input may be implemented when a user 126 uses a keyboard and mouse that are a part of user input 120.

In one embodiment (see FIG. 5, described in greater detail below), each cell display shows data for input or editing. After being input, the data is validated according to rules. Validation rules include absolute rules or relative rules. Absolute rules define specific values or limits on cell contents. Relative rules define relationships to the content of other cells. The validation rules are defined in a business logic description.

The business logic description is a file stored in rule storage element 106. A data validation module 104 uses the rules in the business logic description file to scrutinize the content of the cells in tabular interface 102. Based on its scrutiny, data validation module 104 dynamically determines compliance or non-compliance of cell contents with the rules. Data validation module 104 applies the data validation rules, as well as interoperability rules between data elements, that are stored in rule storage element 106. Through tabular interface 102, data validation module 104 guides a user in modifying data, and validates the data set before it is used for further processing.

The rules in rule storage element 106 are designed by a domain expert with authority to create, modify, or delete business rules. To facilitate construction of the business logic description file, a rule creator and editor module 108 is provided to the domain expert via a suitable interface 150 such as a personal computer. Various tools for facilitating rule-based expert systems are known in the art.

As a product design is completed, it becomes part of an overall "solution" for the customer. At this time, a solutions configuration module 170 can transform the data in the tabular interface into a tentative or final design. Designs may be stored in a design storage element 172, either automatically or under instruction by a user through a suitable interface 174. Additionally, specific results 176 flowing from solutions configured in block 170 are produced. As understood herein, the term "solution" denotes a proposal to a client with a design and pricing supporting that design. The term "design" denotes a telecommunication network and associated components and services to be provided by the supplier company. Finally, the term "result" denotes multiple options of the solution to be considered by the recipients of the proposal.

Figure 2:
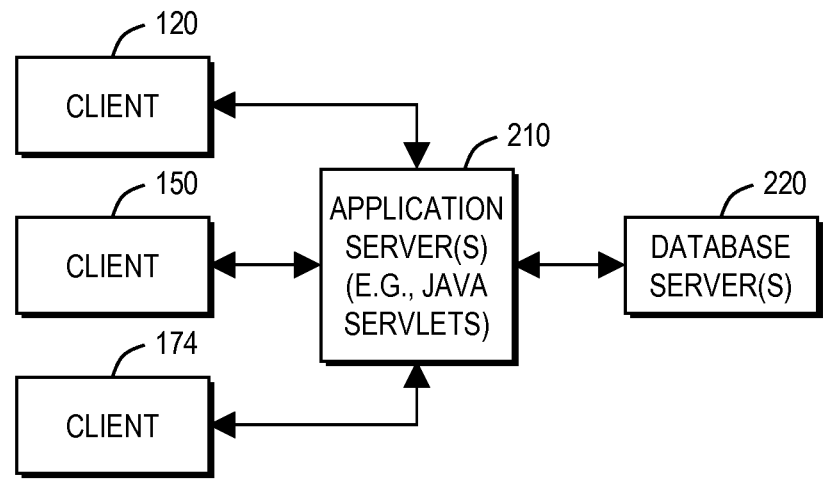
FIG. 2 shows a software model employed by one embodiment.

FIG. 2 shows a software model employed by one embodiment. The FIG. 2 embodiment follows a client-server model. Various clients (such as input device 120, interface 150, and interface 174, all from FIG. 1) may communicate with one or more application servers 210. The client side is typically a personal computer loaded with standard software packages including web browsers.

In one embodiment, the application servers are implemented as Java servlets. Here, servlets are understood to be small programs that runs on a server computer. In particular, servlets can be Java applets that run in a web server. Of course, other application server implementations lie within the contemplation of the invention.

The application servlets 210 allow the various clients to communicate with a corresponding database through one or more database servers 220 (for example, Oracle based). Client 120 may communicate with tabular interface 102 (FIG. 1). Likewise, client 150 may communicate with rule storage element 106 through rule creator and editor 108. Similarly, client 174 may communicate with design storage element 172 through solutions configuration module 170. Of course, implementation of some or all of the functions described herein may be achieved using software models other than the client-server model. In an alternative embodiment, tabular interface 102 is represented on a personal computer constituting a user's local client.

In addition to client-database communication, the application servers perform functions such as user authentication, data validation, customer service browsing and configuration, price browsing and calculations, message and alert handling, proposal creation, contract creation, status request fulfillment, order submission and tracking, credit check interfacing, session management, user type management, external interfacing, administrative functions, content management, electronic contract approval, customer self-service, and the like.

Figure 3:
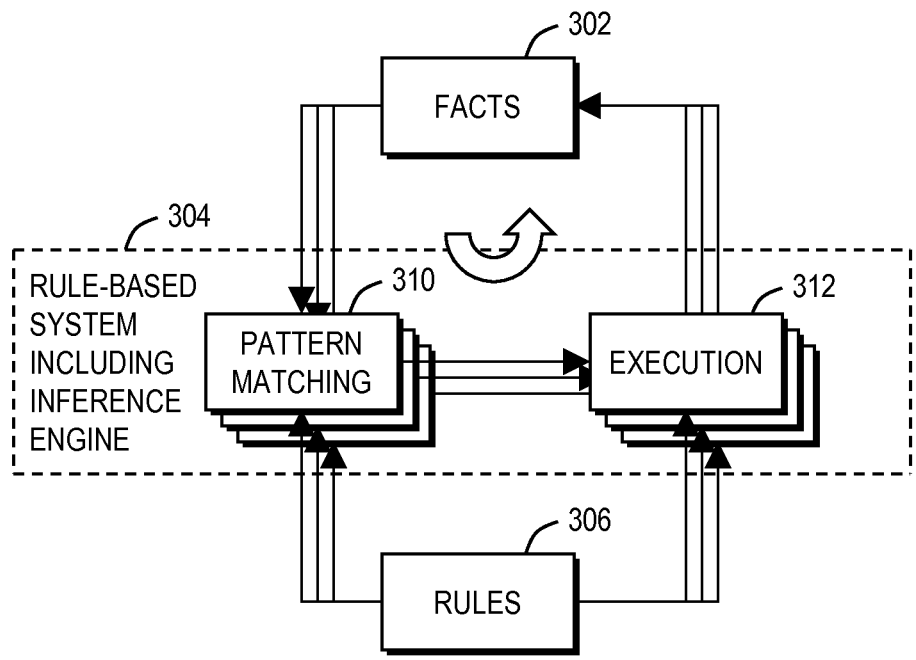
FIG. 3 illustrates principles of rule-based data validation that may be employed by the embodiment of FIG. 1.

FIG. 3 illustrates rule-based data validation employed by one embodiment of data validation module 104 (FIG. 1). Facts are stored in a fact storage element 302, and rules are stored in a rule storage element 206. An inference engine 304 applies the rules to the facts. In one embodiment, FIG. 3 elements 302, 304, 206 embody interface 102, data validation module 104, and rule storage element 106, respectively, in FIG. 1.

Rules constitute "if . . . then . . . " statements. The "if" portion involves a set of one or more conditions that relate to facts. Pattern matching element 310 applies rules to fact patterns and determines whether the conditions are satisfied. When the set of conditions for a particular rule are satisfied, then the rule is said to "fire." The "then" portion of the rule statement includes one or more actions to be taken when the conditions are satisfied. Execution element 312 performs the actions specified in the rule that has fired.

Typically, the actions performed involve detecting violations of data consistency rules and flagging them on interface 102 so that the user can change data to be consistent. Other actions involve automatic or conditional changing of cell data, potentially avoiding the necessity of user involvement. In one embodiment, facts are input in parallel to plural pattern matching elements 310, and functions are performed in parallel by plural execution elements 312.

Figure 4:
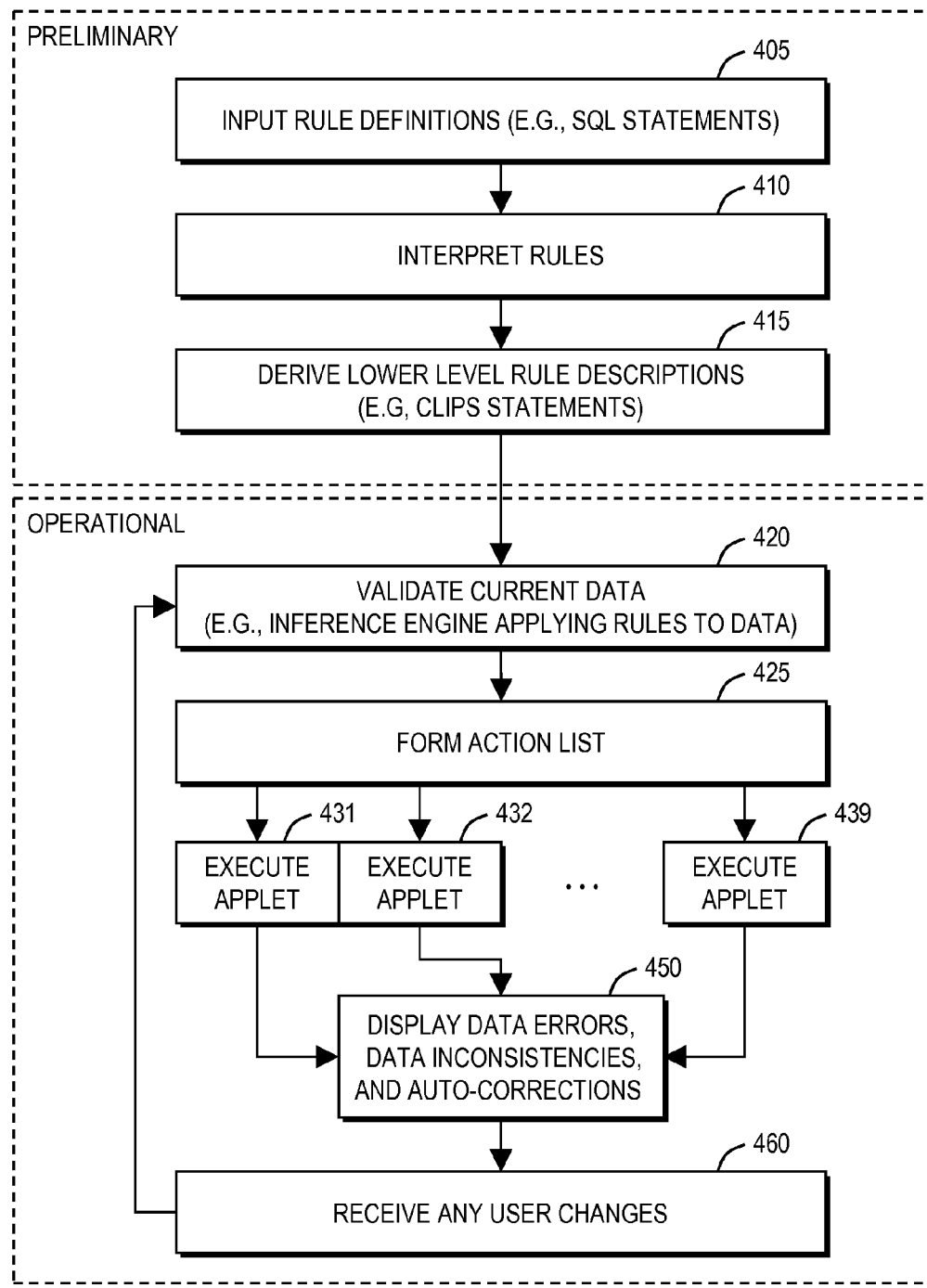
FIG. 4 is a flowchart showing one embodiment of a method according to one embodiment of the invention.

FIG. 4 is a flowchart showing method steps according to one embodiment. Blocks 405, 410, and 415 may be considered preliminary steps, while subsequent steps are considered operational steps.

Block 405 indicates the input of rule definitions into rule storage element 106 (FIG. 1). In one embodiment, this input is through an expert's use of rule creator and editor 108.

The rules are based on a knowledge of the domain in question, such as telecommunications service provisioning. The rules embody knowledge of the relationship between data elements, as well as the characteristics of each data element. Such characteristics include, for example, upper and lower bounds of numerical data, and acceptable and unacceptable data values.

In one embodiment, the rule definitions are expressed SQL or XML statements, although other rule expressions lie within the scope of the invention.

A sample rule expressed in XML is expressed in Table I.

TABLE I

Sample Rule in XML

```
<rule recurse="false" type="warning" active="true">
    <from>group1</from>
    <where>product_family='Dedicated'</where>
    <where>cascaded_site='No'</where>
    <where>(product_type ='GMIS' Or product_type ='AVTS' )
    </where>
    <where>not (egress_pop_id ='Least Cost Pop')</where>
    <where>not (egress_pop_id =0)</where>
    <error>
        <message>Chosen peering pop may not be least cost.
        </message>
        <column columnName="egress_pop_id"
        tableName="eg_site_input"/>
    </error>
</rule>
```

Tables II and III indicate how the rule of Table I may be split into separate input and action components.

TABLE II

Input Rule: Name + SQL statement

```
<Rule>
    <Name>8702</Name>
    <Value>  SELECT (index) AS tuple_index, (index) AS site_index,
        (8702*1) AS code, 'group1' AS dataset FROM group1
        WHERE product_family='Dedicated' AND
        cascaded_site='No'
        AND (product_type ='GMIS' Or product_type ='AVTS' )
        AND not (egress_pop_id ='Least Cost Pop')
        AND not (egress_pop_id =0)
    </Value>
    <Recurse>false</Recurse>
</Rule>
```

TABLE III

Action Statement: Refers to Name

```
<error name="8702.0">
    <message>Chosen peering pop may not be least cost.</message>
    <column tableName="eg_site_input"
    columnName="egress_pop_id" />
</error>
```

Block 410 indicates the interpretation of the rules. Java code applets may perform rule interpretation.

Block 415 indicates deriving lower level description of rules, based on the SQL interpreted in block 410. Lower level rule description may be in any suitable form of expression, such as statements in the CLIPS (C Language Integrated Production System) expert system programming language developed by NASA.

At this time, the rule set may be stored in rule storage element 106, in preparation for operation described in the following steps 420-460. In one embodiment, steps 420-460 are performed iteratively, as indicated by a loop in the FIG. 4 flowchart.

In one application presented for purposes of illustration, a customer's proposed communications network includes cooperating components of commensurate size and bandwidth capacities. A specific description of such a network is represented as a point in a multidimensional space. A set of well designed networks constitutes a subset of such a space, defined by a set of constraints on subsets of the set of components of the network. Such constraints are captured in the business logic description file and satisfy all such constraints in a network editing tool. In this example, a finalized rule set in rule storage element 106 (FIG. 1) enables data validation element 104 to assist user 126 to use interface 102 to arrive at a feasible (valid and non-contradictory) network design that also fulfills the customer's requirements.

Figure 5:
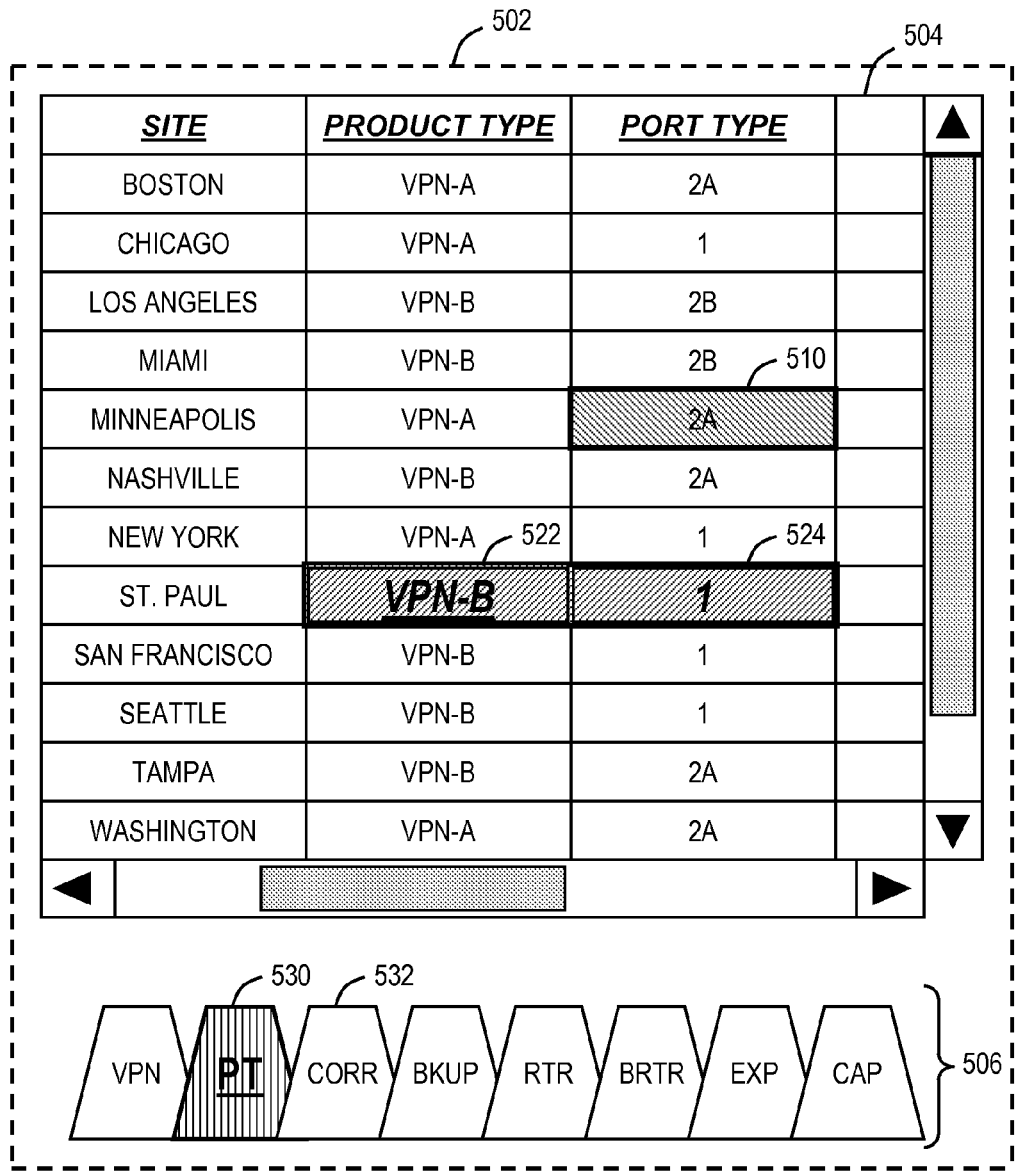
FIG. 5 shows an example of a tabular interface 102 (FIG. 1).

During operation, the tabular interface is displayed to a user 126 on a suitable display unit 122. User 126 uses a suitable input device 120 to enter or edit cell data into tabular interface 102. A simplified example of a portion of a tabular interface 102 is shown in FIG. 5. In FIG. 5, an example 502 of FIG. 1's tabular interface 102 includes a familiar spreadsheet-format portion 504 including rows and columns of cells that display data. The illustrated data includes fields for site locations, product type (such as a VPN of type A or B), port type (such as port types 1, 2A or 2B), and so forth. Further, a set of command and information inputs are provided, one embodiment of which involves a set of tabs 506. Of course, additional input modes, such as right-clicking on a cell and drop-down menus, may supplement the examples of inputs 506 that are specifically shown.

For each column in the table, the business description file defines parameters such as the column's width, its label, font and data type. Data types include, for example, character string, numeric of several types, date, and so forth. Data may be constrained to a specific set of data choices (pick-lists). The business logic description may also define default data values for particular cells. Any of the cell content's features listed above may be constrained by a function of the content of other cells. The desired relationship between different data items is expressed in rules that are part of the business logic description.

After data is captured, block 420 indicates that the validation module validates the data or flags errors or inconsistencies. In one embodiment, a rule-based expert system (see FIG. 3) performs the data validation.

Block 425 indicates formation of an "action" list based on application of the rules to the present data. The action list has an entry for each data error or inconsistency. For each entry on the action list, a function is performed by a processing element which may be a Java applet. Parallel execution of respective functions by the Java applets is shown by blocks 431, 432 . . . 439. The Java applets involve execution of respective functions by execution modules 312 (FIG. 3). Such functions involve flagging of data errors or inconsistencies, or automatic or prompted correction of data as described above.

Block 450 indicates emphatic (highlighted) displaying of the data errors and inconsistencies, or highlighting of any data corrections made automatically by the Java applets. Each cell display uses color, font, size, outlining, italicization, or other indicator to show whether or not its contents conform to the validation rules. To illustrate by a specific example, a user's entry of data into a first cell 510 may cause an inconsistency with existing data in other cells 522, 524. The rules in the business logic file in rule storage element 106 allow the data validation module 104 to detect the inconsistency and, as shown in FIG. 5, highlight the other cells 522, 524 that require the user's attention.

Optionally, the user may learn why the data validation module flagged an inconsistency by clicking on at tab 530. When a tab is activated, data validation module 104 causes the tabular interface to display a window (not shown) having an explanation of the detected data inconsistency or other rule violation. The window contents guide the user in entering consistent data into cells 522, 524, or perhaps in entering different data into cell 510 to make it consistent with the existing data in cells 522, 524.

Further, the invention envisions that the data validation module may itself be instructed to take corrective action. For example, clicking on a tab 532 invokes a function that changes the contents of cells 522, 524 based on a choice of possible pre-programmed defaults or calculated values. Thus, using functional tab 532 instead of informational tab 530 facilitates the iterative process of making the spreadsheet's data consistent.

Moreover, the data validation module makes the iterative process even more automatic by including rules that automatically change the values in cells 522, 524, without waiting for a user to enter data and even without waiting for the user to invoke corrective function tab 532.

Block 460 indicates the input of any user changes that may be made as a result of the flagging of previously detected data errors or inconsistencies. Thereafter, control loops back to block 420. Block 420 validates the current data, which now includes any changes made manually by the user or automatically by the data validation module in a previous iteration of loop 420-460.

If additional inconsistencies are discovered based on the new data entry, then the affected cells are highlighted, allowing the user to enter consistent data. This process is repeated until no inconsistencies are present in the tabular interface. In this manner, user 126 employs interface 102 to arrive at a feasible, well designed network that not only fulfills the customer's chosen requirements but also satisfies the rules in the business logic description.

In one embodiment, the apparatus is a computer or a cluster of computers, powered by software to execute the functionality described herein. The functional elements described above may be embodied by any suitable systems for performing the described methods, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The invention envisions at least one computer readable medium. Examples of computer readable media include compact discs, hard disks, floppy disks, tape, magneto optical disks, PROMs (for example, EPROM, EEPROM, Flash EPROM), DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports a computer-implemented method of guiding a user in designing a product defined by data. The method involves examining (420) items of the data to detect whether each item conforms to rules (106) or violates the rules; performing (431 . . . ) at least one action in response to a detection of a rule violation; displaying (450) the data to the user in a manner emphasizing at least one particular data item that caused the rule violation; receiving (460) any new data input from the user; and repeating the examining, action performing, and displaying steps using the new data.

The rules may constitute respective statements including "if" clauses that describe data patterns and "then" clauses that specify actions to perform if the respective data matches the respective patterns; and the examining step may constitute using an inference engine in a rule-based expert system to apply the rules to the data items.

The action performing step may include performing actions specified in the "then" clauses of the rules.

The action performing step may include performing plural actions in parallel using server applets.

The displaying step (450) may include displaying data defining a current state of the product in a tabular format including cells containing the data, including displaying data detected to have caused the rule violation in a first manner that is visibly distinct from a second manner of displaying other data that is not detected to have caused the rule violation.

The displaying step may include displaying the data detected to have caused the rule violation using a distinguishing emphasis in a manner selected from a group of distinguishing emphases consisting essentially of color, font, font size, cell outlining, and italicization.

After a user inputs new data to replace data detected to have caused a rule violation in a previous iteration of the examining step, a subsequent iteration of the displaying step may involve not emphasizing the new data.

The action performing step may include, without regard to any new data input from the user, automatically changing some of the data that caused the rule violation so that the changed data removes the rule violation.

The product may be a telecommunication service, and the rules may include requirements that define characteristics of at least one telecommunication network underlying the telecommunication service; and the examining step may include examining customer requests that have been input as part of the data and that define desired characteristics of the telecommunication service.

The rule may include requirements taken from a group consisting essentially of network technical requirements, customer account requirements, cost requirements, and pricing requirements.

The method may further comprise a preliminary step of inputting rule definitions (405) to form the rules by which the data are examined in the examining step.

The present disclosure also supports a computer-implemented method of guiding a user in designing a product defined by data. The method involves using a rule-based expert system, examining (420) items of the data to detect whether each item conforms to rules (106) in the rule-based expert system or whether any items violate the rules; forming a list (425) of at least one action to be taken in response to a detection of a rule violation, wherein a rule violation includes an error in a data item and an inconsistency between at least two data items; performing (431 . . . ) the at least one action using a corresponding applet; displaying (450) the data to the user in a manner emphasizing for the user at least one particular data item that caused the rule violation, the displaying step including displaying data defining a current state of the product in a tabular format including cells containing the data, including displaying data detected to have caused the rule violation in a first manner that is visibly distinct from a second manner of displaying other data that is not detected to have caused the rule violation; receiving (460) any new data input from the user; and repeating the examining, list forming, action performing, and displaying steps using the new data.

The present disclosure further supports computer program products including computer executable code or computer executable instructions that, when executed, causes a at least one computer to perform the described methods.

The present disclosure further supports systems configured to perform the described methods.

Many alternatives, modifications, and variations will be apparent to those skilled in the art in light of the above teachings. Of course, those skilled in the art readily recognize that are numerous applications of the invention beyond telecommunications network solutions. While the present invention has been described with reference to one or more particular embodiments, those skilled in the art recognize that many changes may be made thereto without departing from the spirit and scope of the present invention. It is therefore to be understood that within the scope of the appended claims and their equivalents, the invention may be practiced otherwise than as specifically described herein.

What is claimed is:

1. A computer-implemented method of guiding a user in designing a product defined by data, the method comprising:
   examining, by a processor, items of data to detect whether each item conforms to rules;
   performing, by the processor, an action in response to a detection of a rule violation;
   displaying, by the processor, the data items in a tabular format including cells and in a manner emphasizing a first data item that caused the rule violation and emphasizing a second data item that existed prior to the first data item but that is associated with the rule violation caused by the first data item, the action comprising the displaying;
   receiving, by the processor, a control input from a user; and
   in response to receiving the control input from the user, automatically changing, by the processor, the second data item to one of a plurality of possible values for the second data item, the one of the plurality of possible values being selected by the processor to cause the rule violation to be corrected.

2. The method of claim 1, wherein:
   the rules constitute respective statements including first clauses that describe data patterns and second clauses that specify actions to perform if respective data matches the respective patterns; and
   the examining comprises using an inference engine in a rule-based expert system to apply the rules to the data items.

3. The method of claim 2, wherein the performing of the action includes:
   performing actions specified in the second clauses of the rules.

4. The method of claim 3, wherein the performing of the action includes:
   performing plural actions in parallel using server applets.

5. The method of claim 1, wherein:
   the displaying further includes displaying data detected to have caused the rule violation in a first manner that is visibly distinct from a second manner of displaying other data that is not detected to have caused the rule violation; and
   the displaying further includes displaying the data detected to have caused the rule violation using a distinguishing emphasis in a manner selected from a group of distinguishing emphases consisting essentially of color, font, font size, cell outlining, and italicization.

6. The method of claim 1, wherein the performing of the action includes:
   without regard to any new data input from the user, automatically changing a third data item that caused a second rule violation.

7. The method of claim 1, wherein:
   the product is a telecommunication service;
   the rules include requirements that define characteristics of a telecommunication network underlying the telecommunication service; and
   the examining includes examining customer requests that have been input as part of the data items and that define desired characteristics of the telecommunication service.

8. The method of claim 7, wherein:
   the rule includes requirements taken from a group consisting essentially of network technical requirements, customer account requirements, cost requirements, and pricing requirements.

9. The method of claim 1, further comprising:
inputting rule definitions to form the rules by which the data items are examined.

10. The method of claim 1, further comprising, after automatically changing the second data item to the one of the plurality of possible values selected by the processor, displaying the second data item without emphasizing the second data item.

11. A tangible machine readable storage medium comprising machine readable instructions which, when executed, cause a machine to perform operations comprising:
examining items of data defining a product to detect whether the item conform to rules or violate the rules;
performing an action in response to a detection of a rule violation;
displaying the data items in a tabular format including cells and in a manner emphasizing a first data item that caused the rule violation and emphasizing a second data item that existed prior to the first data item but that is associated with the rule violation caused by the first data item, the action comprising the displaying;
receiving a control input from a user; and
in response to receiving the control input from the user, automatically changing the second data item to one of a plurality of possible values for the second data item, the one of the plurality of possible values being selected by the machine to cause the rule violation to be corrected.

12. The storage medium of claim 11, wherein:
the rules constitute respective statements including first clauses that describe data patterns and second clauses that specify actions to perform if respective data matches the respective patterns; and
the examining operation comprises using an inference engine in a rule-based expert system to apply the rules to the data items.

13. The storage medium of claim 12, wherein the performing of the action operation includes:
performing actions specified in the second clauses of the rules.

14. The storage medium of claim 11, wherein the operations further comprise, after automatically changing the second data item to the one of the plurality of possible values selected by the machine, displaying the second data item without emphasizing the second data item.

15. The storage medium of claim 11, wherein the performing of the action operation includes:
without regard to any new data input from the user, automatically changing a third data item that caused a second rule violation.

16. A system for guiding a user in designing a product defined by data, the system comprising:
memory having machine readable instructions stored thereon; and
a processor to execute the instructions to perform operations comprising:
examining items of data to detect whether each item conforms to rules or violates the rules;
performing an action in response to a detection of a rule violation;
displaying the data items in a tabular format including cells and in a manner emphasizing a first data item that caused the rule violation and emphasizing a second data item that existed prior to the first data item but that is associated with the rule violation caused by the first data item, the action comprising the displaying;
receiving a control input from a user; and
in response to receiving the control input from the user, automatically changing the second data item to one of a plurality of possible values for the second data item, the one of the plurality of possible values being selected by the processor to cause the rule violation to be corrected.

17. The system of claim 16, wherein the operations further comprise, after automatically changing the second data item to the one of the plurality of possible values selected by the processor, displaying the second data item without emphasizing the first data item.

18. The system of claim 16, wherein the performing of the action operation includes:
without regard to any new data input from the user, automatically changing a third data item that caused a second rule violation.

* * * * *